United States Patent Office

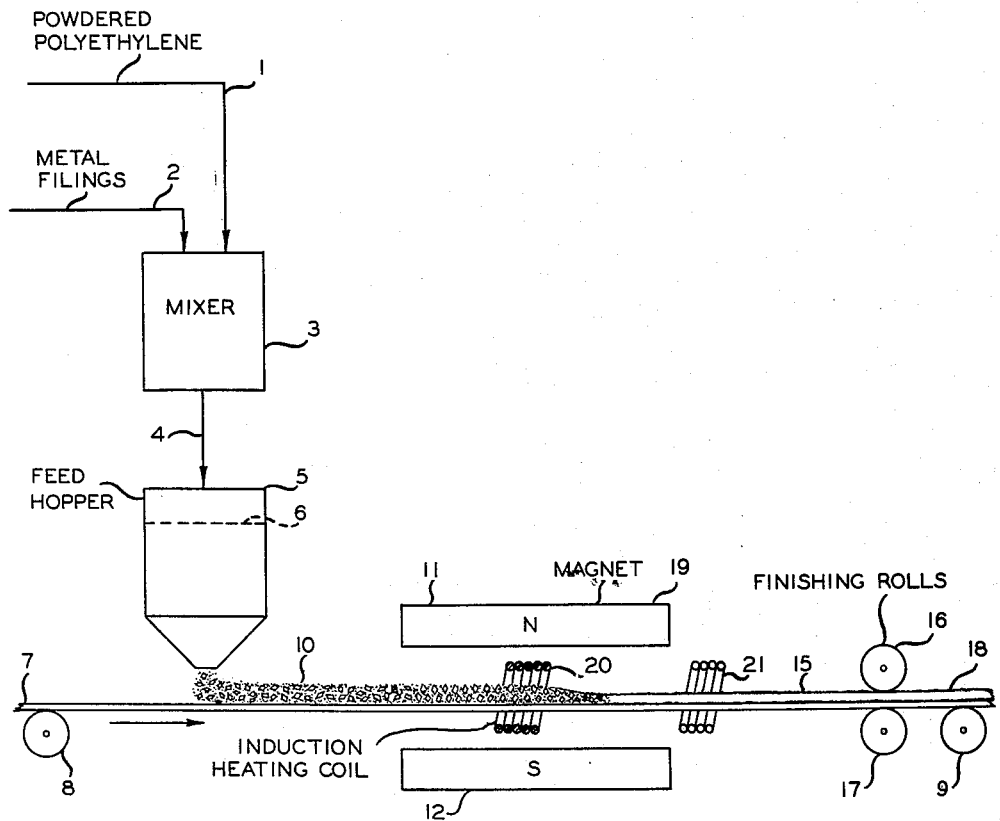

3,117,092
Patented Jan. 7, 1964

3,117,092
METHOD OF PREPARING COMPOSITIONS COMPRISING PARAMAGNETIC METALS AND THERMOPLASTIC MATERIALS
Harry W. Parker, Bartlesville, Okla., assignor to Phillips Petroleum Company, a corporation of Delaware
Filed Sept. 1, 1960, Ser. No. 53,445
3 Claims. (Cl. 252—62.5)

This invention relates to a novel composition of matter comprising a paramagnetic metal and a thermoplastic material and the method of preparing same. In one aspect this invention relates to magnetically orienting particulate paramagnetic metals in a solid thermoplastic material which is highly viscous in the molten state.

It is well known in the art to incorporate metal powders and metal filings in thermoplastic materials while said materials are in the molten state. However, there are many thermoplastic materials, such as polyethylene, which are highly viscous in the molten state making it very difficult to orient or align the metal particles while said material is in the molten state. I have now discovered a method of aligning metal particles in a composition comprising a particulate paramagnetic metal and a thermoplastic material.

It is an object of this invention to provide a novel composition of matter comprising a particulate paramagnetic metal and a thermoplastic material.

It is another object of this invention to provide a method of magnetically aligning a particulate paramagnetic metal in a composition comprising said metal and a thermoplastic material.

Yet another object of this invention is to provide a novel composition comprising a particulate paramagnetic metal and a thermoplastic material wherein said particles are aligned transversely to the surface of said composition.

Still another object of this invention is to provide a process for magnetically aligning a particulate paramagnetic metal tranversely to the surface of a composition comprising a paramagnetic metal and a thermoplastic material.

These objects are broadly accomplished by a novel composition of matter comprising a thermoplastic material and a particulate paramagnetic metal prepared by admixing finely divided thermoplastic material and said metal particles, subjecting said admixture to a magnetic field to orient said metal particles, melting said thermoplastic material while retaining said particle orientation and solidifying said admixture while the particles are so oriented.

The composition of this invention makes it possible to produce a novel article of manufacture having many desirable properties. By varying the size and shape of the metal particles, the ratio of metal to plastic and by varying the strength of the magnetic field, many utilitarian objects having highly decorative features are made by this invention. For instance, by the incorporation of decorative metals such as nickel, films, sheets and variously shaped objects are prepared having a decorative surface. By the use of hard metals, such as iron, objects such as gears and bearings having good wear characteristics are prepared. By the utilization of proper molding techniques to reduce voids to a minimum, materials having good electrical properties such as plastic electromagnets are possible by the method of this invention. By the use of metal particles having one dimension greater than the others, such as filaments, which are then aligned so that a major proportion of the metal is at the upper and lower surface of the sheet, or other object, the compositions of this invention have excellent anti-skid properties. It is also frequently possible to use the metal as a filler to decrease the cost of the composition. These and other objects of the invention will be readily recognized by one skilled in the art by the disclosure and claims.

Heretofore it has been difficult to wed certain thermoplastic materials to metals in view of the non-wetting propensity of many thermoplastic materials, such as polyethylene. In addition, many of these same thermoplastic materials are highly viscous making it virtually impossible to align the metal particles while the thermoplastic material is in the molten state.

This invention is particularly applicable to these solid thermoplastic materials which have generally high viscosities when melted and which do not readily wet metals. Illustrative of the thermoplastic materials which can be incorporated in the composition of this invention are solid olefin polymers, homopolymers or copolymers of monoolefins such as ethylene, propylene, butylene, etc. as well as copolymers of monoolefins and diolefins such as butadiene, isoprene, etc. Other polymers include acrylic polymers, such as polyvinyl chloride; polyalkyl acrylates, such as polymethyl acrylate, polymethyl methacrylate, polyethyl acrylate, polyethyl ethacrylate, etc., styrene polymers, either modified or unmodified, such as butadiene, acrylonitrile-styrene polymer, acrylonitrile-styrene copolymer, etc.; and cellulose acetate, polyamides of the nylon type and the like.

Solid 1-olefin polymer having a density of 0.940 to 0.990 gram/cc. and a molecular weight of 35,000 to 280,000 as determined by methods hereinafter described are particularly advantageous components of the composition and process of this invention.

Density as used herein is determined by compression molding a slab of the polymer, cooling said molding at a temperature reduction rate of 15 to 20° F. per minute to room temperature, cutting a pea-sized specimen therefrom, and placing said specimen in a 50-ml., glass-stoppered graduate. Carbon tetrachloride and methyl cyclohexane are added to the graduate from burettes in proportion such that the specimen is suspended in the solution. During the addition of the liquids, the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73 to 78° F., the balance is adjusted until the pointer is at zero. The value shown on the scale is taken as the specific gravity.

The concept of molecular weight is fully discussed in Hogan and Banks, Patent No. 2,825,721, issued March 4, 1958. Unless otherwise specified, the term "molecular weight," as used herein, means molecular weight based on inherent viscosity using the Staudinger equation (molecular weight=$2.445 \times 10^4 \times$ inherent viscosity). Inherent viscosity is based on the viscosity of a solution containing 0.2 gram of polymer in 50 ml. of tetralin using an Ostwald-Fenske No. 50 viscometer at 130° C.

$$\eta = \frac{\frac{t_1}{t_0}}{C}$$

where $\eta$=inherent viscosity
$t_1$=time of efflux of solution in seconds
$t_0$=time of efflux of pure solvent in seconds
$C$=concentration of solution in grams polymer/100 ml. solution The following discussion is directed specifically to the treatment of solid olefin polymers; however, this is not intended in any limiting sense and any of the polymers previously mentioned are within the scope of the invention.

Solid olefin polymers are prepared usually by contacting the olefin to be polymerized with a catalyst at an elevated temperature and pressure, preferably in the presence of the solvent or diluent material. The particular temperature to be employed in each individual case depends on the catalyst used, the olefins to be polymerized and the operating conditions employed such as pressure, space velocity, diluent to olefin ratio, etc.

A highly satisfactory and often preferred, highly crystalline olefin polymer can be obtained by the process set forth in the patent of Hogan and Banks, supra. One satisfactory process technique suitable for preparing polymers useful in this invention is that in which polymerization is carried out in a solvent such as pentane at a temperature below the solution temperature, thereby forming polymer in discrete particles. This invention is also particularly applicable to thermoplastic materials whose powders can be sintered and/or fused at nominal temperatures and pressures. These and other solid olefin polymers are preferred materials for the composition and process of this invention but it is to be understood that this invention is not to be limited thereto.

While any paramagnetic material is suitable for the process and composition of this invention, the strongly paramagetic and ferro magnetic materials are preferred because of the ease with which these materials are aligned by the application of a magnetic field. Preferred paramagnetic materials include the ferro magnetic metals selected from the group consisting of iron, cobalt, nickel, and alloys of iron, cobalt, nickel and mixtures thereof with manganese, aluminum, chromium, silicon, gadolinium and mixtures thereof. In general, any paramagnetic material is usable which when subjected to a magnetic field aligns itself within this field.

The shape and size of the particles of thermoplastic material and metal is governed by the ultimate use. Preferably the thermoplastic material is a finely divided solid, more preferably the solids are small enough to pass through at least a 20 mesh screen, even more preferably 50 to 300 mesh or even finer. The shape of the individual thermoplastic particle is not critical providing the dimensions permit sufficient freedom of movement of the metal particles to permit alignment thereof upon the application of a magnetic field and includes plates, balls, rods and filaments. It is also possible to use powder not so finely ground as well as a mixture of powder and larger pellets so long as a substantially homogeneous admixture of metal and plastic is obtainable and the proper molding conditions are maintained to reduce or eliminate voids.

Although the thermoplastic material, such as polyethylene, may be produced in a multitude of shapes and sizes a suitable form for handling and storage is pellets which may be produced by any suitable means such as subjecting solid polymer, which may be in the form of a fluff, to the heat and pressure of an extruder, extruding said polymer through a slot or dye to form a filament which is then chopped into finite lengths by any suitable means. These pellets are then pulverized or ground into finely divided powder by any suitable grinding means known to the art, such as a hammer or ball mill. A preferred final treatment for grinding the material to the size and shape preferred for the process and composition of this invention resides in the utilization of the shearing action developed in a hammer mill equipped with revolving hammers which pass in close relation to a shear agent. The micro pulverizer is an example of such a hammer mill. In comminuting iron filling, wires, steel wool, foils, etc., used as the paramagnetic metal in the composition of this invention, these materials can also be finished in the type of hammer mill described hereinbefore for pulverizing the plastic.

The size and shape of the particulate paramagnetic metal used as one component of the composition of this invention is also determined by the ultimate utilization of the object formed from this composition, so long as the particles have sufficient freedom of movement within the mass of thermoplastic solids to be aligned when subjected to the force of a magnetic field. For instance, flakes, plates, pellets, filaments or irregularly shaped particles are usable. It is generally preferred that one dimension be from two to ten times that of the other dimensions so that orientation of the particulate metal along the long axis is accomplished by subjection thereof to the magnetic field. Preferably, the metal particles are aligned transversely to the surface of the composition to reinforce the thermoplastic material and to prevent the dislodging of metal particles close to the surface when used, for example, as anti-skid materials. Any suitable means known to the art for grinding or shaping the metal into the desired shape and size may be used. One skilled in the art can easily determine by routine experiment the proper shapes and sizes of the particles of metal and thermoplastic materials to be used in the particular desired object. For instance, when making an anti-skid sheeting material from the composition of this invention, it is frequently desirable to utilize filaments having a length approximately equal to or slightly less than the thickness of the sheet.

The compositions of this invention are useful throughout a wide range of metal to thermoplastic material ratios. Preferred compositions contain from about 10 to about 95 weight percent, more preferably from 50 to 95 weight percent, of the metal based on total composition weight.

For many purposes, it is useful to incorporate in the composition of this invention additives such as pigments, colors, reinforcing or nonreinforcing fillers, antioxidants, and the like. Preferably the composition contains from 0 to 30 percent by weight based on total thermoplastic weight of said additives. For instance, one desirable pigment material is finely ground titanium dioxide which has developed organic dyes on the surface particles of said pigment. Natural and synthetic clays, carbon black, limestone, marble, dolomite, oil shale or mineral colors developed by treating natural or synthetic inorganic substances are also useful additives. Table I, below, sets forth a typical formula suitable for the preparation of the powder mixtures utilized in this invention, but it should be understood that the amounts and materials set forth therein are not to be limiting.

TABLE I

| Ingredient: | Weight percent |
| --- | --- |
| Paramagnetic metals | 10–95 |
| Thermoplastic materials | 3.3–90 |
| Additives | 0–30 |
| Total | 100 |

When additives are incorporated in the composition of this invention, it is preferred to add these materials to the plastic before grinding or otherwise powdering or shaping the thermoplastic material. For instance, these materials can be added during the finishing stages of the polymer preparation, such as in the roller mill, or Banbury mixer. The filled plastic can then be extruded, sheeted, flaked, pelleted or otherwise comminuted to the desired particle size and shape for mixing with metal.

To prepare the composition of this invention, the finely divided solid thermoplastic material, such as polyethylene, is admixed with the particulate paramagnetic metal by any means known to one skilled in the art.

Preferably the components will be intimately admixed to provide a substantially homogenous mixture of the components. For instance, the components are preferably intimately admixed in a mixer or tumbler such as a drum mixer. However, it is within the scope of the invention to form heterogeneous mixtures. Also, in some instances, such as preparing thin sheet materials, it is satisfactory to form two layers of powder and metal particles, preferably with the metal layer on top, applying the magnetic field and then melting the plastic which results in the metal particles being distributed throughout the mass due to the effect of gravity and the magnetic field.

Subsequent to the preferred thorough mixing of the components, the composition is molded to the shape desired by the ultimate object. For instance in one method of preparing a sheet of material, an admixture of metal powder and thermoplastic powder is evenly distributed on a moving belt at the thickness and width which will produce the sheet size desired upon melting of the admixture. The admixture is then subjected to a magnetic field of sufficient strength to align the particulate metal within the thermoplastic material. Preferably, the magnetic field is aligned in such a way as to orient the particles of metal transversely to the surface of the object, although orientation thereof parallel to the surface of the object is also within the scope of this invention.

Any suitable means known to one skilled in the art is satisfactory for producing the magnetic field. One suitable means is the so-called induction method wherein a coil encompassing the admixture is supplied with direct current which produces a magnetic field represented by lines of force to orient the particles. Preferably the surrounding apparatus are of diamagnetic material so that the effective strength of the magnetic field on the composition is at a maximum. The strength of the required magnetic field will depend on a large number of factors including the size and shape of the particulate metal and the thermoplastic material. Generally, the strength should be sufficient to align the metal particles within the thermoplastic powder but not so large as to result in the removal of the metal from the composition. Preferably, the strength of the field is sufficient to distribute a major portion of the metal at the surfaces of the composition. For instance, it has been found that when using iron filings with a polyethylene powder that passes through at least a 20 mesh screen a ceramic permanent magnet having a field of 100 to 1000 gauss is sufficient to provide the desired distribution of metal particles within the composition to form an object having antiskid properties.

Subsequent to the alignment of the metal particles within the composition of the magnetic field, the composition is subjected to heat so as to melt the thermoplastic material. It is essential that the previously attained orientation of the metal particles be retained during this melting step. In many cases, the viscosity of the molten thermoplastic material is sufficient, particularly at the lower range of temperatures, to prevent significant movement of particles during melting. However, to insure the retention of the metal particle alignment, it is usually desirable to maintain the magnetic field during the melting step.

The heating of the composition may be provided by any suitable means known to the art, such as, for example, by providing an electrical heating element around the outer surface, by providing a double wall vessel with heated fluid in the annular space, by a gas fired oven, by high frequency radio waves which heat the material by induction and the like.

Due to the highly viscous nature of most of the thermoplastic materials and their generally very low coefficient of thermal conductivity, the polymer must be maintained at a temperature in excess of the melting point for a period of time sufficient to insure complete fusion of the polymeric mass. It will be obvious to those skilled in the art that as the temperature is increased the period of time sufficient to attain this complete fusion will be decreased proportionally. Also, in view of the fact that most of the thermoplastic polymers, such as ethylene polymers, tend to have undesirable surface degradation upon prolonged exposure to elevated temperatures, it is generally advisable to maintain the polymer at this elevated temperature only for a period of time sufficient to achieve complete fusion.

Another factor affecting the time of heating is occluded vapor. In many uses it is necessary to maintain this elevated temperature for a period of time sufficient to remove substantially all the occluded vapors as well as to complete the fusion.

The temperature to which the composition is subjected is above the melting point but below the decomposition point of the thermoplastic material. For instance, I have found that for high density ethylene polymer having a density of 0.940 to 0.990 gram/cc. and a melting point of about 260° F. the preferred temperature is in the range of 260° to approximately 600° F. for a period of time sufficient to complete fusion which depends on the size and shape of the article.

After attaining complete fusion the composition is solidified by cooling below the melting point of the thermoplastic material. For instance, with the aforementioned high density ethylene polymer the composition is cooled below 260° F., preferably below 250° F. It is sometimes important that the rate of cooling be controlled since the low coefficient of thermal conductivity prevents the escape of thermal energy from the interior of the sheet or object and may result in the formation of voids and cracks in the interior due to uneven shrinkage. This difficulty is, of course, lessened in thin sheets and rapid cooling is possible. As discussed hereinbefore for the melting step, it is sometimes desirable to maintain the magnetic field on the composition during at least the early stages of the cooling step so as to retain the orientation of the metal particles within the composition.

It may be desirable in some utilizations, such as when making sheets of this composition, to pass the sheet through a finishing roll or embossing roll to smooth out the surface of the sheet. It is also within the scope of this invention to apply a thin sheet of thermoplastic material, which may be similar or dissimilar to the thermoplastic material used in the composition of this invention, by bonding or otherwise joining said film to said sheet. One suitable method is passing the sheet through a heated finishing roll so as to melt the surface of the sheet and simultaneously or subsequently pass a thin film of thermoplastic material between said roll and said sheet thereby bonding the two together and providing a smoother surface. It will be readily seen by one skilled in the art that many variations are possible within the scope of this invention.

The invention will be further illustrated by reference to the accompanying drawing. For simplification the description of the drawing will be limited to the use of a powdered polyethylene and iron filings.

Referring to the drawing, powdered polyethylene is supplied through conduit 1, from a source not shown, to a mixer 3 along with metal filings through conduit 2, from a source not shown. In mixer 3 the powdered polyethylene and metal filings are intimately admixed by any means known to those skilled in the art. Subsequent to the thorough admixing of the components the admixture is supplied through conduit 4 to feed hopper 5 for distribution onto a moving endless belt 7 conveyed on rollers 8 and 9. The belt 7 is maintained at the desired speed to provide an evenly distributed layer 10 of powdered polyethylene and metal filing admixture at the desired thickness and width. The admixture is then conveyed by belt 7 within a magnetic field produced by means of an electro magnet 19, represented diagrammatically by poles 11 and 12, supplied by direct current (source not shown) producing a magnetic field for a period of time sufficient to orient the particles transversely to the direction of travel of the admixture. Induction heating coil 20 encompasses the mass 10 and is maintained at a temperature sufficient to melt the powdered polyethylene. When this is done in a continuous manner, such as shown in the drawing, it is, of course, necessary to alter the length of the induction coils to vary the time of heating. The molten mass then leaves the area of heating as shown at 15 and is permitted to cool or is subjected to cooling means such as cooling coils 21. The required length and strength of the magnet is readily determined by one skilled in the art and depends on many factors hereinbefore described including the viscosity of the thermoplastic material as well as the particular metal and size thereof. The solidified sheet then passes to the next step of the finishing process or to storage. As shown in the drawing, the sheet passes through finishing rolls to provide a smoother surface by means of finishing rolls 16 and 17. The finished product 18 then passes to further usage or to storage.

The following example is presented in illustration of the invention but the invention is not intended to be limited thereby.

*Example*

Five grams of pelleted polyethylene having a density of 0.960 gm./cc. and a melt index of 0.9 was ground on a hammer mill to pass a 60-mesh screen and admixed with 95 grams of iron filings.[1] This admixture was then distributed evenly to a depth of ¼ inch in an aluminum foil dish having a diameter of 2¼ inches and a thickness of about 0.005 inch. A ceramic type magnet was positioned under the dish so that its field of about 300 to 500 gauss passed through the powder. Under the influence of this magnetic field, the metal particles rotated until they were nearly vertical with respect to the bottom of the metal dish. An infra red lamp was placed over the assembly for about 15 minutes to fuse the plastic after which it was turned off and the plastic was permitted to solidify in the presence of the magnetic field.

The resulting plastic disk was approximately 1/16 inch thick and was characterized by a very rough upper surface, although the surface adjacent the metal foil was relatively smooth. The metal particles were in evidence at the bottom surface because of the gravity effect and the inability of the polyethylene to wet the metal. The upper surface was ideally suited for use as an antiskid material.

While certain examples, structures, composition and process steps have been described for purposes of illustration the invention is not limited to these. Variation and modification within the scope of the disclosure and the claims can readily be effected by those skilled in the art.

---

[1] Baker and Adamson 20 mesh, degreased iron filings.

What I claim is:

1. A process for aligning a particulate paramagnetic metal in a thermoplastic material which does not readily wet metals when melted comprising intimately admixing a finely divided solid thermoplastic material having a particle size of less than 20 mesh and between about 10 and about 95 weight percent based on total composition weight of a particulate paramagnetic metal having one dimension from 2 to 10 times that of the other dimension and a size which permits magnetic orientation within a matrix of said finely divided thermoplastic solids, subjecting said admixture of solids to a magnetic field to orient said metal particles within said finely divided thermoplastic solids, thereafter melting said thermoplastic material while retaining sufficient magnetic field strength to maintain said orientation and cooling said thermoplastic material to below the solidification point thereof to preserve said metal particle orientation.

2. The process of claim 1 wherein said particulate metal comprises iron filings of about 20 mesh.

3. A process for aligning iron filings in polyethylene comprising intimately admixing finely divided solid polyethylene having a mesh size of less than 20 and between about 10 and about 95 weight percent based on total composition weight of iron filings having one dimension from 2 to 10 times that of the other dimensions and capable of passing through a 20 mesh screen, subjecting said admixture to a magnetic field of 100 to 1000 gauss to orient said iron filings transversely to a surface of said composition, thereafter heating said admixture to above 260° F. but below 600° F. while retaining sufficient magnetic field strength to maintain said orientation and cooling said composition to below 260° F. while retaining said particle orientation.

References Cited in the file of this patent

UNITED STATES PATENTS

| | | |
|---|---|---|
| 1,930,788 | Buckner | Oct. 17, 1933 |
| 2,199,526 | McCowen | May 7, 1940 |
| 2,762,778 | Gorter et al. | Sept. 11, 1956 |
| 2,848,748 | Crump | Aug. 26, 1958 |
| 2,849,312 | Peterman | Aug. 26, 1958 |

FOREIGN PATENTS

| | | |
|---|---|---|
| 781,128 | Great Britain | Aug. 14, 1957 |